United States Patent
Albrecht

[11] 3,944,244
[45] Mar. 16, 1976

[54] TELESCOPIC SAFETY STEERING COLUMN FOR MOTOR VEHICLES

[75] Inventor: Wilhelm Albrecht, Vaihingen, Germany

[73] Assignee: Daimler-Benz Aktiengesellschaft, Germany

[22] Filed: Nov. 26, 1974

[21] Appl. No.: 527,197

[30] Foreign Application Priority Data
Nov. 26, 1973 Germany.............................. 2358733

[52] U.S. Cl..................... 280/87 R; 74/493; 180/78
[51] Int. Cl.²........................................... B62D 1/18
[58] Field of Search........... 280/87 A, 87 R; 74/492, 74/493; 180/78; 188/1 C

[56] References Cited
UNITED STATES PATENTS

| | | | |
|---|---|---|---|
| 2,779,208 | 1/1957 | Pittman................................. | 74/493 |
| 3,505,897 | 4/1970 | Scheffler...................... | 280/87 R X |
| 3,600,971 | 8/1971 | Scarvelis...................... | 280/87 R X |
| 3,612,223 | 10/1971 | Shiomi............................. | 74/492 X |
| 3,621,732 | 11/1971 | Kaniut ............................... | 180/78 X |
| 3,797,601 | 3/1974 | Barenyi................................. | 180/78 |
| 3,855,876 | 12/1974 | Albrecht........................ | 280/87 R X |

FOREIGN PATENTS OR APPLICATIONS

| | | | |
|---|---|---|---|
| 834,760 | 5/1960 | United Kingdom.................. | 74/493 |
| 2,227,327 | 1/1973 | Germany ............................. | 74/493 |

Primary Examiner—M. H. Wood, Jr.
Assistant Examiner—Terrance L. Siemens
Attorney, Agent, or Firm—Craig & Antonelli

[57] ABSTRACT

A telescopic safety steering column for motor vehicles which includes a steering wheel displaceable from its normal operating position relative to the outer steering column under energy absorption by the steering wheel and an energy-absorbing support of the outer column at a fixed vehicle part; this support being provided by an undulated tubular member which is arranged parallel to the center longitudinal axis of the safety steering column and is stable as regards its position while the fixing of the outer column is provided in proximity to the steering wheel by a guide strap which becomes ineffectual when the body of a vehicle passenger impinges against the steering wheel.

17 Claims, 3 Drawing Figures

TELESCOPIC SAFETY STEERING COLUMN FOR MOTOR VEHICLES

The present invention relates to a telescopic safety steering column for motor vehicles with a steering wheel displaceable relative to the outer column under energy absorption by the steering wheel, and with an energy-absorbing support of the outer column at a fixed vehicle part.

Such a support is described in the German Offenlegungsschrift 2,227,327, whereby a slot is provided in a profiled plate which, in case of collision, is expanded by an engaging mandrel or pin projecting from a further plate. Since the two profiled plates must have a certain spacing from one another, various structural spacer parts are necessary which serve, in part, also for the guidance at the beginning of the displacement. Such a construction, however, is expensive and presupposes structural parts which are accurate as regards dimensions and tolerances.

It is the aim of the present invention to provide an energy-absorbing support which, compared to the prior art construction, has a construction that is simpler and more favorable as regards cost. In particular, the guidance at the beginning of the deformation phase is to take place by more simple means.

Accordingly, a telescopic safety steering column for motor vehicles with a steering wheel displaceable relative to the outer column under energy-absorption by the steering wheel and with an energy-absorbing support of the outer column at a fixed vehicle part is proposed whereby according to the present invention the support is provided by an undulated or corrugated tubular member which is stably arranged as regards its position in parallel to the center longitudinal axis of the safety steering column and whereby the fixing of the outer column is provided in proximity to the steering wheel by a guide clip, strap or collar which is put out of engagement in case of a body impact.

The use of an undulated or corrugated tubular member offers particular advantages since such tubular member represents a commercially available and thus price-favorable structural part. Additionally, an undulated or corrugated tubular member possesses a high absorption capacity.

In one preferred embodiment of the present invention, a bracket accommodating one end of the corrugated or undulated tubular member projects from the outer column, by means of which the corrugated or undulated tubular member is pressed against the fixed vehicle part — possibly under prestress or with play — and a jacket-like casing partly surrounding the undulated or corrugated tubular member and adapted to be stressed in tension, is provided which is connected with the fixed vehicle part.

It is particularly favorable if the jacket-like casing is open toward the outer column and is constructed as guide slot, in which the bracket is guided safely against canting in case of impact.

According to a further feature of the present invention, the guide strap or collar may form a unit, together with the bracket, which commences to displace only upon reaching a predetermined load.

It may be of advantage if the displacement of the steering wheel relative to the outer column starts under energy absorption by the steering wheel with the exhaustion of the deformation capacity of the undulated or corrugated tubular member.

Accordingly, it is an object of the present invention to provide a telescopic safety steering column for motor vehicles which avoids by simple means the aforementioned shortcomings and drawbacks encountered in the prior art.

Another object of the present invention resides in a telscopic safety steering column for motor vehicles which is characterized by simplicity in structure and reliability of operation.

A further object of the present invention resides in a telescopic safety steering column for motor vehicles which is relatively inexpensive and avoids the need for costly structural parts with small tolerances.

Still another object of the present invention resides in a telescopic safety steering column of the type described above in which the guidance at the beginning of the deformation phase is to take place by relatively simple means.

These and other objects, features and advantages of the present invention will become more apparent from the following description when taken in connection with the accompanying drawing which shows, for purposes of illustration only, one embodiment in accordance with the present invention, and wherein.

Figure 1:
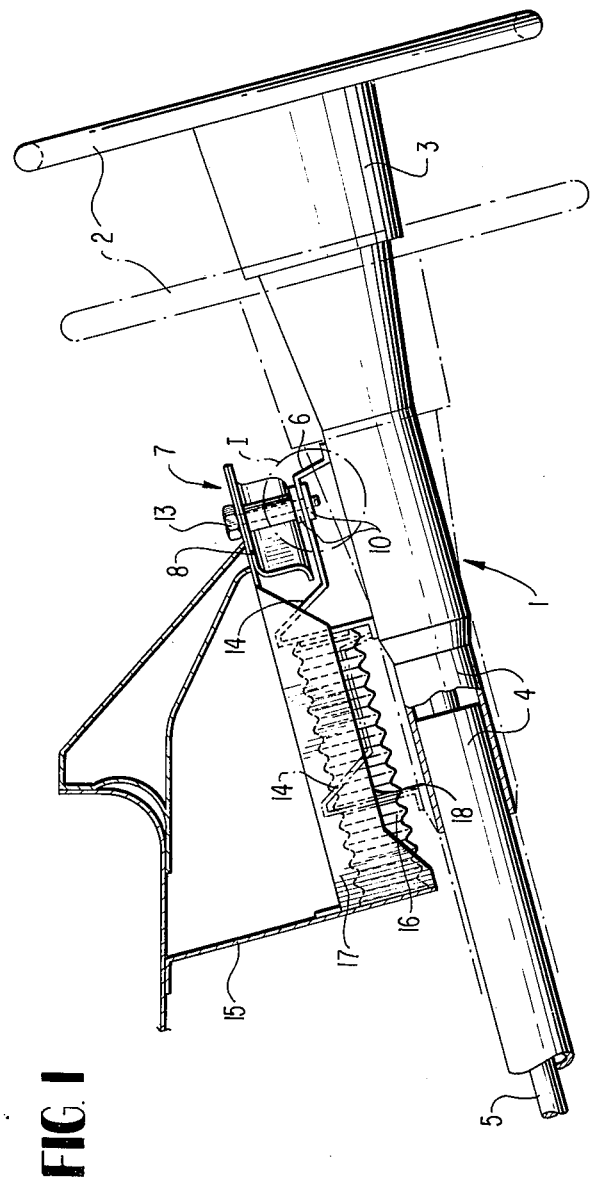
FIG. 1 is a schematic elevational view of a telescopic safety steering column equipped in accordance with the present invention.

Referring now to the drawing wherein like reference numerals are used throughout the various views to designate like parts, the telescopic safety steering column generally designated by reference numeral 1 which is illustrated in FIG. 1, essentially consists of a steering wheel 2 with an adjoining deformation member 3 of conventional type. An outer column 4 which may be constructed so as to be telescopically retractable, surrounds a steering spindle 5 connected with the steering wheel 2 in a known manner not shown and variable in its effective length by conventional means. The outer column 4 is connected with a fixed vehicle part generally designated by reference numeral 7 by way of a guide strap, bar or collar 6, whereby the fixed vehicle part 7 is constructed in the illustrated embodiment as braced cross bearer 8.

Figure 2:
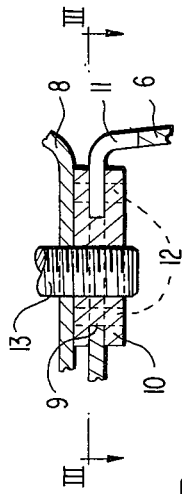
FIG. 2 is an enlarged cross-sectional view illustrating the details of the parts indicated by the dash and dot circle I of FIG. 1.
Figure 3:
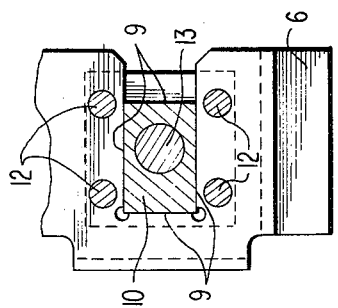
FIG. 3 is a partial cross-sectional view taken along line III—III of FIG. 2.

The construction and operation of the guide strap 6 is visible from FIGS. 2 and 3. A tear-off or shear-off nut 10, provided with notches or with a groove 9 extending along the entire circumference, accommodates between itself the guide strap 6 provided with an elongated guide slot 11, whereby elements 12, acting as shearing pins and produced preferably by spray method, effect a connection between the guide strap 6 and the shear-off nut 10. The nut 10 is secured at the cross bearer 8 by means of a bolt 13.

The guide strap 6 forms a part of a bracket 14 whereby an undulated or corrugated tubular member 16, which is stable as regards its position and extends in parallel to the center longitudinal axis of the safety steering column 1, is arranged between the bracket 14 and a fixed vehicle part 15. A jacket-like casing or cover 17 is disposed partly about the corrugated or undulated tubular member 16 and extends below the same in proximity to the fixed vehicle part 15. From there, the jacket-like casing 17 opens into a guide slot 18, not shown in detail herein, into which engages the bracket 14. The jacket-like casing 17 is additionally connected to the cross bearer 8 so that an element results which can be stressed in tension.

As a result of the abutment of the end part of the guide slot 11 at that part of the indicated notch or groove 9 of the tear-off or shear-off nut 10, which is indicated by the lead line of reference numeral 9 in FIG. 2, the steering column 1 cannot displace itself in the direction toward the vehicle passenger space in case of an accident. Only in case of a body impact against the steering wheel 2, the elements 11 are sheared off and the bracket 14 moves forwardly. The guide slot 11 thereby moves along the tear-off or shear-off nut 10 and is thereupon released. A further lateral guidance, however, continues to be assured in that the bracket 14 during its forward movement and during the compression of the undulated tubular member 16, which is connected therewith (not shown), is moved along in the guide slot 18 safe against canting. The end of this deformation phase is reached when the steering wheel and the bracket 14 have assumed the position indicated in dash and dot lines. If the body impact energy has not yet been reduced up to this instant to a tolerable extent, then the deformation of the deformation member 3 may now take place in a known manner.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all those changes and modifications as are encompassed by the scope of the appended claims.

I claim:

1. In a telescopic safety steering column for motor vehicles which includes an outer column means, a steering wheel displaceable relative to said outer column means under energy absorption, and energy-absorbing support means for supporting said outer column means at a fixed vehicle part, the improvement comprising said energy-absorbing support means including an undulated tubular member stably arranged parallel to the center longitudinal axis of said safety steering column, and fixing means for fixing said outer column means to said fixed vehicle part in proximity to said steering wheel, said fixing means including guide means for guiding said tubular member with respect to said axis upon impact against said steering wheel, characterized in that the guide means includes a guide strap, and characterized in that a bracket means which accommodates one end of the tubular member projects from the outer column means, the tubular member being pressed against the fixed vehicle part by said bracket means, and in that a cover means partly surrounding the tubular member and stressable in tension is provided which is connected with the fixed vehicle part.

2. A telescopic safety steering column according to claim 1, characterized in that the tubular member is pressed under prestress against the fixed vehicle part by said bracket means.

3. A telescopic safety steering column according to claim 1, characterized in that the cover means is open in the direction toward the outer column means and is constructed as guide slot in which the bracket means is guided safely against canting in case of an inpact.

4. A telescopic safety steering column according to claim 3, characterized in that the guide means forms a unit together with the bracket means which commences to be displaced only upon reaching a predetermined load.

5. A telescopic safety steering column according to claim 4, characterized in that the displacement of the steering wheel relative to the outer column means under energy absorption starts upon exhaustion of the deformation capacity of the tubular member.

6. A telescopic safety steering column according to claim 5, characterized in that the tubular member is being pressed under prestress against the fixed vehicle part by said bracket means.

7. In a telescopic safety steering column for motor vehicles which includes an outer column means, a steering wheel displaceable relative to said outer column means under energy absorption, and energy-absorbing support means for supporting said outer column means at a fixed vehicle part, the improvement comprising said energy-absorbing support means including an undulated tubular member stably arranged parallel to the center longitudinal axis of said safety steering column, and fixing means for fixing said outer column means to said fixed vehicle part in proximity to said steering wheel, said fixing means including guide means for guiding said tubular member with respect to said axis upon impact against said steering wheel, characterized in that a bracket means which accommodates one end of the tubular member projects from the outer column means, the tubular member being pressed against the fixed vehicle part by said bracket means, and in that a cover means partly surrounding the tubular member and stressable in tension is provided which is connected with the fixed vehicle part.

8. A telescopic safety steering column according to claim 7, characterized in that the tubular member is pressed under prestress against the fixed vehicle part by said bracket means.

9. A telescopic safety steering column according to claim 7, characterized in that the cover means is open in the direction toward the outer column means and is constructed as guide slot in which the bracket means is guided safely against canting in case of an impact.

10. A telescopic safety steering column according to claim 7, characterized in that the guide means forms a unit together with the bracket means which commences to be displaced only upon reaching a predetermined load.

11. A telscopic safety steering column according to claim 10, characterized in that the displacement of the steering wheel relative to the outer column means under energy absorption starts upon exhaustion of the deformation capacity of the tubular member.

12. A telescopic safety steering column according to claim 11, characterized in that the displacement of the steering wheel relative to the outer column means under energy absorption starts upon exhaustion of the deformation capacity of the tubular member.

13. In a telescopic safety steering column for motor vehicles which includes an outer column means, a steering wheel displaceable relative to said outer column means under energy absorption, and energy-absorbing support means for supporting said outer column means at a fixed vehicle part, the improvement comprising said energy-absorbing support means including an undulated tubular member stably arranged parallel to the center longitudinal axis of said safety steering column, and fixing means for fixing said outer column means to said fixed vehicle part in proximity to said steering wheel, said fixing means including guide means for guiding said tubular member with respect to said axis upon impact against said steering wheel.

14. A telescopic safety steering column according to claim 13 characterized in that the guide means includes a guide strap.

15. A telescopic safety steering column according to claim 13, characterized in that said guide means guides said tubular member only upon said impact.

16. A telescopic safety steering column according to claim 13, characterized in that said guide means includes frangible members for releasing said outer column means from a fixed position with respect to said fixed vehicle part upon said impact such that said tubular member is guided in deformation by said guide means.

17. A telescopic safety steering column according to claim 13, characterized in that said tubular member is deformed upon said impact in the direction of said impact.

* * * * *